(12) United States Patent
Schlender et al.

(10) Patent No.: US 10,395,546 B2
(45) Date of Patent: Aug. 27, 2019

(54) ADAPTIVE CONTENT DELIVERY FOR ONLINE EDUCATION

(71) Applicant: COURSERA, INC., Mountain View, CA (US)

(72) Inventors: Amory B. Schlender, San Francisco, CA (US); Ankit Ahuja, Mountain View, CA (US)

(73) Assignee: COURSERA, INC., Mountain View, CA (US)

( * ) Notice: Subject to any disclaimer, the term of this patent is extended or adjusted under 35 U.S.C. 154(b) by 119 days.

(21) Appl. No.: 15/273,234

(22) Filed: Sep. 22, 2016

(65) Prior Publication Data
US 2018/0082602 A1    Mar. 22, 2018

(51) Int. Cl.
*G09B 5/06* (2006.01)
*G06F 16/435* (2019.01)
*G06F 16/438* (2019.01)

(52) U.S. Cl.
CPC ............ *G09B 5/06* (2013.01); *G06F 16/435* (2019.01); *G06F 16/4393* (2019.01)

(58) Field of Classification Search
CPC .................................................. G06F 17/30029
USPC ........................................................ 434/309
See application file for complete search history.

*Primary Examiner* — Kesha Frisby
(74) *Attorney, Agent, or Firm* — Brake Hughes Bellermann LLP

(57) ABSTRACT

A system includes a processor coupled to a memory. The processor is configured to execute instructions stored in the memory to store an original content of an online education course of a first format type in an online education platform. The processor is further configured to execute the instructions stored in the memory to automatically translate the original content of the online education course from the first format type to a content of a second format type, and to deliver, by the online education platform, the translated content of the online education course in the second format type to a student logged in on a client device.

20 Claims, 6 Drawing Sheets

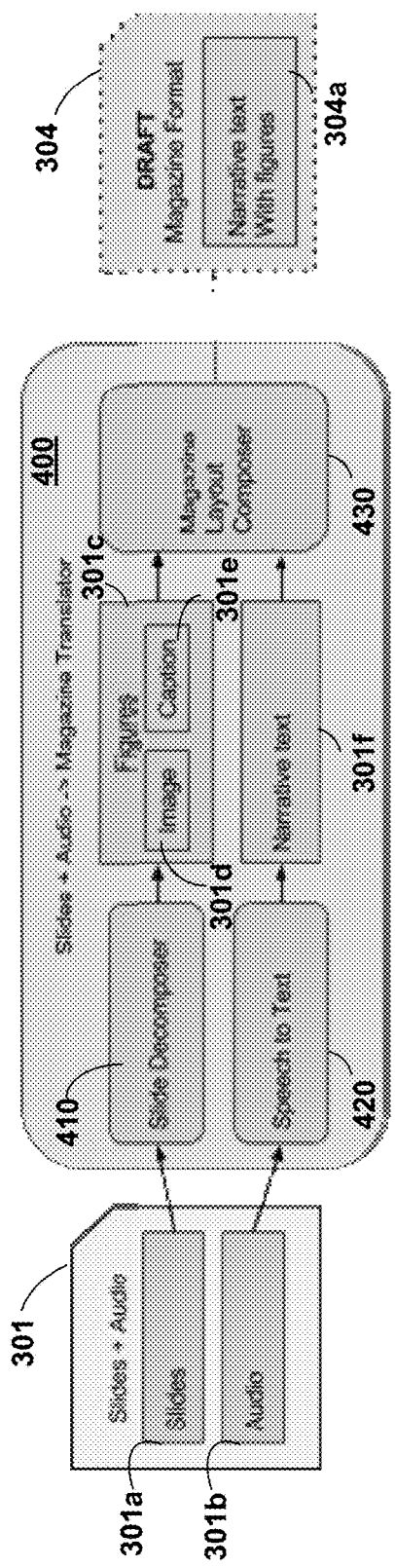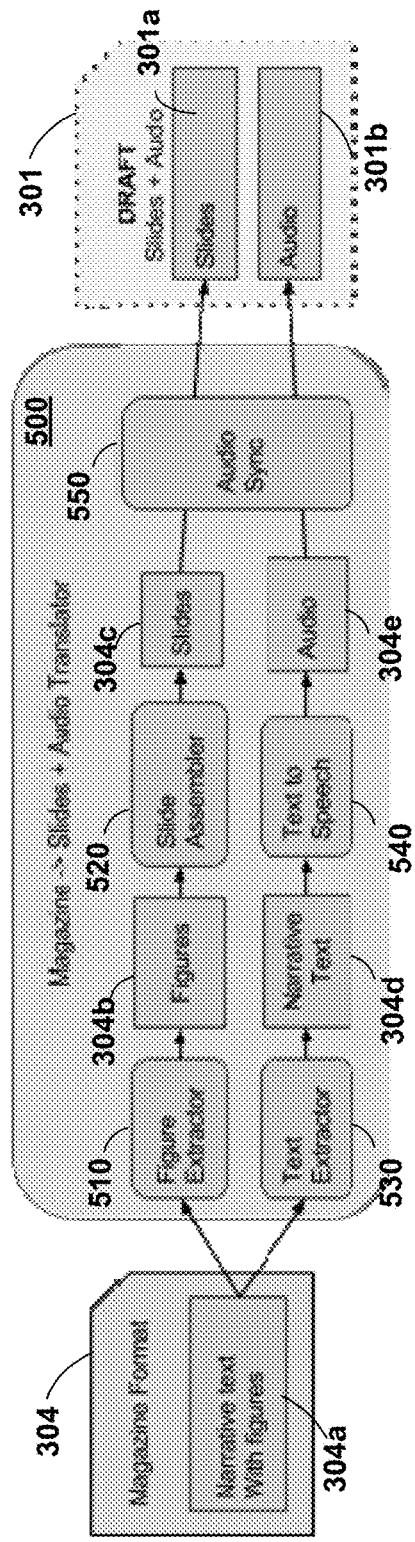

ADAPTIVE CONTENT DELIVERY FOR ONLINE EDUCATION

BACKGROUND

In a school or a university, education courses can be taught to students (e.g., in physical classrooms or lecture halls) using different teaching methods (e.g., verbal—typically in the form of a lecture or presentation; visual—typically in the form of demonstration and practice; etc.). Online learning is a method of delivering educational information via the internet instead of in a physical classroom. Entire education courses with structured programs (e.g., including a series of lectures, demonstrations, quizzes and tests, etc.) can be made available online to students. Often, the content of an education course prepared (e.g., by a university instructor or educator) is made available to the students in a single media or format type (e.g., a video) by an online education provider. The students may receive the online education course content (e.g., the video) on a computing device (e.g., desktop, laptop, tablets, a mobile phone, a smartphone, a radio transceiver, a telephone, a mobile computing device, etc.), which may have a variety of technical capabilities (e.g., internet connections, input/output devices, audio or video capabilities, display size, etc.). Furthermore, students may participate in such courses while in any of a variety of study environments or circumstances (e.g., sitting in a room, travelling in a bus, or walking).

While a video format (or other single format such as text or audio) may be a convenient way for the education course preparer or provider to package the course content, some students may benefit more, or learn better from, course content delivered in alternative media formats (e.g., text or audio, etc.), for example, because of their individual learning styles, study environments, or limitations of the computing devices used to access the course content.

However, in an example scenario, an online education course provider may obtain an education course prepared (e.g., by a university instructor or educator) only in a single media format (e.g., as an online video). Students may have no choice other than to take the online education course in the format it was originally prepared (e.g., an online video) even if the student prefers an alternate format or even if the student's study environment or circumstances (e.g., sitting in a room, travelling in a bus, or walking) are not conducive to watching a video.

Consideration is now being given to adapting delivery of online education course content to the capabilities of the client computer used by a student and his or her study environment or preferences.

SUMMARY

In a general aspect, a system includes a processor configured to execute instructions stored in a memory. The processor executes the instructions to store an original content of an online education course in a database coupled to an online education platform. The original content is of a first format type. The processor is further configured to execute instructions to automatically translate the original content of the online education course stored in the database from the first format type to a content of a second format type, store the translated content of the online education course in the second format type in the database, and deliver, by the online education platform, the translated content of the online education course in the second format type to a student logged in to the online education platform via a client device.

In an aspect of the system, the processor executes the instructions stored in the memory to detect a student preference for the online education course content of the second format type over content of the first format type, and the online education platform delivers the translated content of the online education course in the second format type to the client device based on the detected student preference.

In an aspect of the system, the processor executes the instructions stored in the memory to determine a compatibility of the translated content with the client device type and network conditions, and the online education platform delivers the translated content of the online education course in the second format type to the client device based on the on the determined compatibility.

In an aspect of the system, the processor executes the instructions stored in the memory to automatically translate the original content of the online education course stored in the database from the first format type to a content of a second format type includes using automated translation procedures in a course content translator module coupled to the online education platform.

In an aspect of the system, when the first format type content of the online education course stored in the database includes a video component, the processor executes the instructions stored in the memory to capture image frames of the video component as pictures and convert the pictures into slides for inclusion in the content of the second format type.

In an aspect of the system, when the first format type content of the online education course stored in the database includes an audio component, the processor executes the instructions stored in the memory to automatically transcribe the audio component of the online course content as text for inclusion in the content of the second format type.

In an aspect of the system, when the first format type content of the online education course stored in the database includes an audio component, the processor executes the instructions stored in the memory to automatically extract the audio components of the online course content as audio for inclusion in the content of the second format type.

In an aspect of the system, when the first format type content of the online education course stored in the database includes slides, the processor executes the instructions stored in the memory to automatically decompose each slide into a figure for inclusion in the content of the second format type.

In an aspect of the system, when the second format type content of the online education course includes a magazine-style web page, the processor executes the instructions stored in the memory to automatically lay out figures, captions and narrative text input derived from the content of the first format type in the magazine-style web page of the second format type content.

In an aspect of the system, when the second format type content of the online education course includes a slide show, the processor executes the instructions stored in the memory to automatically synchronize speech and slides input derived from the content of the first format type for inclusion in the content of the second format type.

In a general aspect a method includes storing an original content of an online education course in a database coupled to an online education platform, the original content being of a first format type. The method further includes automatically translating the original content of the online education course stored in the database from the first format type to a content of a second format type, storing the translated content of the online education course in the second format type in the database, and delivering, by the online education platform, the translated content of the online education course in the second format type to a student logged in to the online education platform via a client device.

In an aspect, the method includes detecting a student preference for the online education course content of the second format type over content of the first format type and delivering the translated content of the online education course in the second format type to the student logged in to the online education platform via the client device based on the detected student preference.

In another aspect, the method includes determining a compatibility of the translated content of the online education course with the client device type and network conditions, and delivering the translated content of the online education course in the second format type to the student logged in to the online education platform via the client device based on the determined compatibility.

In an aspect of the method, automatically translating the original content of the online education course stored in the database from the first format type to a content of a second format type includes using automated translation procedures in a course content translator module coupled to the online education platform.

In an aspect of the method, the first format type is a video, a slides-plus-audio, a slides-plus-text, a magazine, a slides only, an audio-only. or a text-only format type.

In an aspect of the method, when the first format type content of the online education course stored in the database includes a video component, automatically translating the original content of the online education course stored in the database from the first format type to a content of a second format type includes capturing image frames of the video component as pictures and converting the pictures into slides for inclusion in the content of the second format type.

In an aspect of the method, when the first format type content of the online education course stored in the database includes an audio component, automatically translating the original content of the online education course stored in the database from the first format type to a content of a second format type includes automatically transcribing the audio component of the online course content as text for inclusion in the content of the second format type.

In an aspect of the method, when the first format type content of the online education course stored in the database includes an audio component, automatically translating the original content of the online education course stored in the database from the first format type to a content of a second format type includes extracting the audio component of the online course content as audio for inclusion in the content of the second format type.

In an aspect of the method, when the first format type content of the online education course stored in the database includes a text component, automatically translating the original content of the online education course stored in the database from the first format type to a content of a second format type includes automatically synthesizing speech audio from an input of plain text derived from the content of the first format type for inclusion in the content of the second format type.

In an aspect of the method, when the first format type content of the online education course stored in the database includes a slide, automatically translating the original content of the online education course stored in the database from the first format type to a content of a second format type includes automatically decomposing the slide into a figure for inclusion in the content of the second format type.

In an aspect of the method, when the second format type content of the online education course includes a magazine-style web page, automatically translating the original content of the online education course stored in the database from the first format type to a content of a second format type includes automatically laying out figures, captions and narrative text input derived from the content of the first format type in the magazine-style web page.

In an aspect of the method, when the second format type content of the online education course includes a slide show, automatically translating the original content of the online education course stored in the database from the first format type to a content of a second format type includes synchronizing speech and slides input derived from the content of the first format type for inclusion in the content of the second format type.

In a further aspect, the method can also further include issuing a verified credential to the student upon completion of the online education course regardless of the the online education course content format accessed and studied by the student.

The details of one or more implementations are set forth in the accompanying drawings and the description below. Further features of the disclosed subject matter, its nature and various advantages will be more apparent from the accompanying drawings, the following detailed description, and the appended claims.

BRIEF DESCRIPTION OF THE DRAWINGS

The accompanying drawings, in which like numerals indicate like components, illustrate embodiments of the disclosed subject matter.

FIG. 4 is a block diagram of an example translation module, which includes procedures for automatically transforming slides-plus-audio content into magazine content, in accordance with the principles of the present disclosure.

FIG. 5 is a block diagram of an example translation module that executes procedures for automatically transforming magazine content into slides-plus-audio content, in accordance with the principles of the present disclosure.

DETAILED DESCRIPTION

Figure 1:
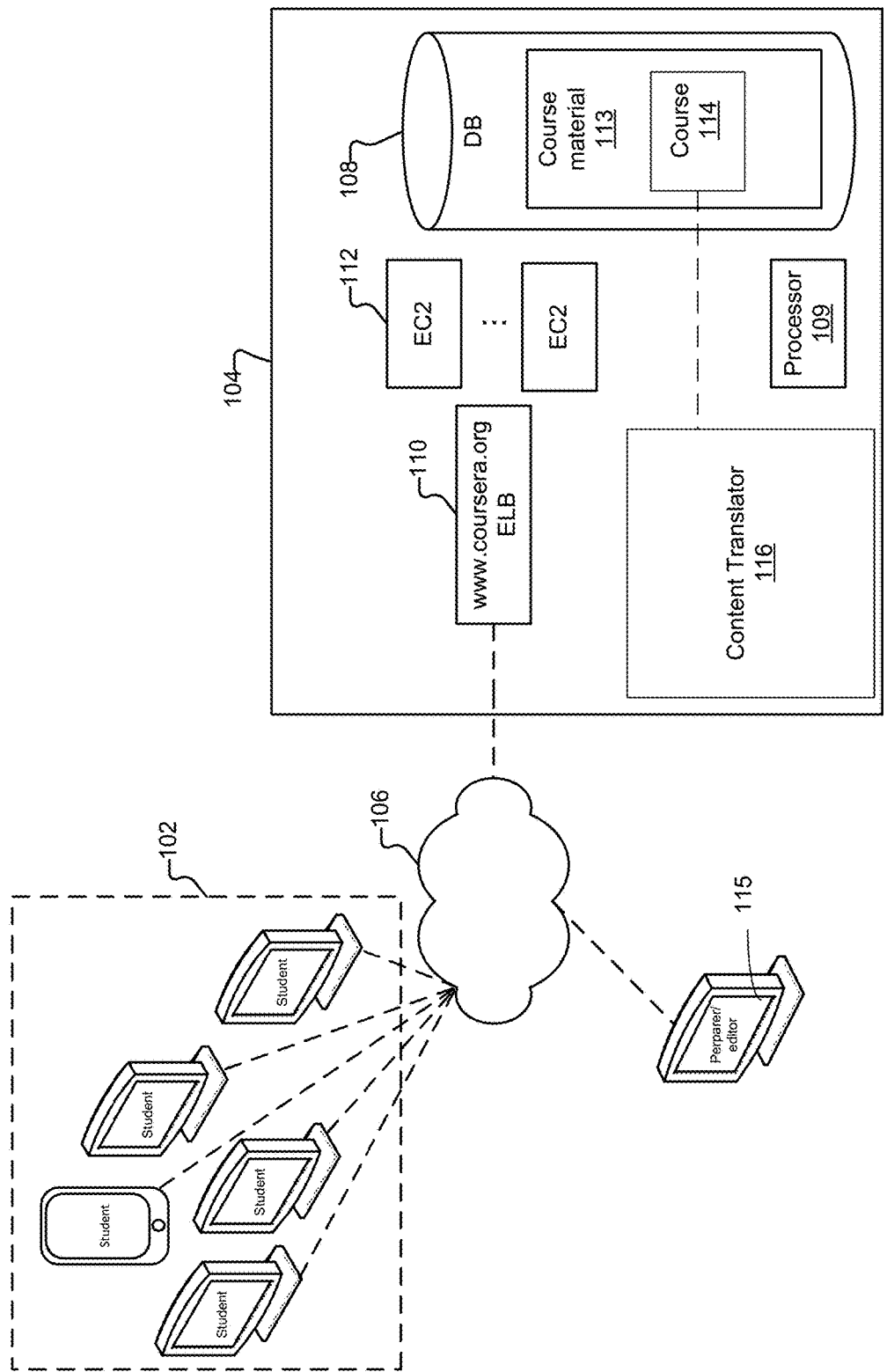
FIG. 1 is a block diagram of an example system for delivering online education courses, in accordance with the principles of the present disclosure.

Systems and methods for providing students with a choice of taking an online education course in an original media or format type as prepared or in alternative media or format types are described herein.

An online education course may have an original or starting media type (e.g., a video) as prepared, for example, by an instructor or educator. Using the systems and methods described herein, the content of online education course may be automatically translated from its original or starting format type (e.g., video) into one or more other format types (e.g., slides-plus-audio, slides-plus-text, magazine, slides only, audio-only. or text-only format type, etc.). The automated translated versions of the online education course may be previewed and validated as meeting the purpose and objectives of the online education course as presented in its original format. The automated translated versions of the online education course may be stored in a database and made available to students according to the student's preference for a format type for the content of the online education course.

Reference will now be made in detail to embodiments of the disclosed subject matter, examples of which are illustrated in the accompanying drawings.

The disclosed subject matter can be implemented in numerous ways, including as a process; an apparatus; a system; a computer program product embodied on a computer readable storage medium; and/or a processor, such as a processor configured to execute instructions stored on and/or provided by a memory coupled to the processor. These implementations, or any other form that the disclosed subject matter may take, may be referred to herein as techniques. In general, the order of the steps of disclosed processes may be altered within the scope of the disclosed subject matter. Unless stated otherwise, a component such as a processor or a memory described as being configured to perform a task may be implemented as a general component that is configured to perform the task at a given time or a specific component that is manufactured to perform the task. As used herein, the term "processor" refers to one or more devices, circuits, and/or processing cores configured to process data, such as computer program instructions. The processor may be a semiconductor-based processor.

A detailed description of one or more embodiments of the disclosed subject matter is provided below along with accompanying figures that illustrate the principles of the disclosed subject matter. The disclosed subject matter is described in connection with such embodiments, but the disclosed subject matter is not limited to any embodiment. The scope of the disclosed subject matter is limited only by the claims and the disclosed subject matter encompasses numerous alternatives, modifications and equivalents. Numerous specific details are set forth in the following description in order to provide a thorough understanding of the disclosed subject matter. These details are provided for the purpose of example and the disclosed subject matter may be practiced according to the claims without some or all of these specific details. For the purpose of clarity, technical material that is known in the technical fields related to the disclosed subject matter has not been described in detail so that the disclosed subject matter is not unnecessarily obscured.

Online Education Courses Delivery Architecture

FIG. 1 illustrates an example arrangement for delivering online education courses, in accordance with the principles of the present disclosure. In the example shown, an online education platform 104 supports massive open online courses ("MOOCs"), in which tens of thousands (or other applicable numbers) of students (learners) can enroll, and participate, in the same course at the same time.

Students, using client devices 102, may connect to online education platform 104 via one or more network(s) 106 that are represented in FIG. 1, for example, as a single network cloud. The students can sign up for an account with the platform, which is, for example, linked to the student's email address. Students interact with online education platform 104 to enroll in courses and receive instructions, for example, via video lectures and handouts. As part of taking a course, students also submit work, such as surveys, quizzes, exams, homework, assignments, etc. Examples of client devices 102 include desktop computers, portable computers, tablets, smartphones, and any other appropriate electronic devices configurable to communicate with online education platform 104 in accordance with the techniques described herein.

In the embodiment shown in FIG. 1, when client devices (e.g., any of devices 102 or 115) attempt to access course materials 113 provided by platform 104, they communicate initially with a load balancer, e.g., an Amazon Elastic Load Balancer (ELB) 110. The ELB distributes traffic across multiple content servers 112 (e.g., Amazon Elastic Cloud Compute (EC2) instances) that serve content to the client devices (e.g., via web frontends, native applications installed on mobile devices, etc.). In some embodiments, databases (e.g., database 108) are used to store information such as account information, personal information, profile information, collected enrollment/registration and authentication information (e.g., keystroke biometrics, webcam headshots, webcam capture of photo ID documentation), credentials (e.g., statements, verified certificates, certifiable course records, etc.), or any other appropriate information. The storage of the data can also be divided across multiple storage locations (e.g., using Amazon Simple Storage Service (S3)). In some embodiments each course is associated with its own database, which is used to store course content (e.g., content submitted by instructors via an interface provided by content servers 112), student information, student submissions, authentication information submitted with the student submissions (which may be used to authenticate the submissions), etc. In some embodiments, multiple databases are used, as applicable. For example, when storing enrollment/registration information collected during an identity-verified track enrollment/registration phase, separate databases can be used for storing different types of enrollment/registration information such as keystroke profiles, headshot photos, photo ID documentation captures, etc. In some embodiments, platform 104 is also configured to host information, such as course records.

The online education platform 104 shown in FIG. 1 is implemented using a scalable, elastic architecture. When the online education platform 104 is referred to as performing a task, such as storing data or processing data, it is to be understood that a sub-component or multiple sub-components of the online education platform 104 (whether individually or in cooperation with third party components) may cooperate to perform that task. Furthermore, certain tasks may be distributed such that a given task is accomplished by multiple instances of a component that is depicted in FIG. 1 as a single component. In some embodiments, the online education platform 104 includes a single device, such as a standard commercially available server (e.g., with a plurality of multi-core processors, 16+ Gigabytes of RAM, and one or more Gigabit network interface adapters) and runs a typical server-class operating system (e.g., Linux). Platform 104 may include other processors (e.g., processor 109), which may be coupled to database 108 for intake and processing of course-related materials.

Support for identity verification by platform 104 may allow students to have their identities verified when enrolling in a course and also may allow for their identities to be verified throughout the duration of the course (e.g., when submitting coursework) to verifiably demonstrate that they have fully participated in the course. Identity verification also allows the students to securely link their coursework to their real identity, adding an additional layer of authenticity to their accomplishments in completing a MOOC. By offering identity-verified tracks for courses, students can also receive verified credentials such as certificates that are accurately attributed to their real identity.

An online education course (e.g., course 114) delivered over the web by platform 104 may include content having any media or format type (e.g., video, slide shows, audio or text). Video combines a sequence of electronically coded images to form a moving picture on a display screen. A video frame is one of the many electronically coded still images which compose the complete moving picture. Videos usually have audio components that correspond with the pictures being shown on the screen. A frame rate is the number of frames or images that are displayed on the screen per second. Frame rates are used in synchronizing audio and pictures.

A slide show or slide presentation is a series of pictures or pages of information. A slide is a single page of the presentation. Collectively, a group or series of slides may be known as a slide deck. The slide show or slide presentation is an exposition of a series of slides on the display screen.

In some instances, the online education course content may be delivered as magazine-style web pages in a web browser on the client device. A magazine-style web page may have the look and feel of a print magazine page with text laid out, for example, in one of more columns or blocks on the page. One or more captioned figures may intersperse the columns or blocks of text on the page.

In an example implementation, instructors (or course content editors, preparers, or reviewers) can use a client device (e.g., client 115) connected to platform 104 to provide course content of an online education course (e.g. course 114) in an "original" format type (e.g., video, text only, etc.), in accordance with the principles of the present disclosure.

Online Education Course Content Media or Formats

While online education courses whose content is only textual or only audio may be available, the content of most available online education courses (e.g., a university lecture, or a how-to-do-something demonstration) is predominantly video, which students can watch (streamed or downloaded) using a web browser or a native application on client devices 102.

Video combines a sequence of visual images to form a moving picture. Videos usually have audio components that correspond to, and are synchronized with, the moving picture. Video is the predominant choice of medium or format for online education courses because it engages students, who may be, for example, easily bored and may need flashing lights, dynamic movement, or a visual connection with a real human in front of them in order to get and keep their attention. Video may be the only choice when the online education course shows a student how to do something that can only be taught visually.

However, the predominance of video as the media or format for the content for online education courses has several drawbacks from the perspective of providing a large number of online education courses to a diverse student population. A first drawback relates to the fact that high quality videos may be difficult and expensive to produce. Furthermore, video production may slow the time-to-launch of an online education course, and may lock out partners/instructors without adequate video production resources from presenting useful online education courses. Another drawback is that online education course videos are difficult to update and are rarely updated after course launch. Furthermore, from a learning perspective, a large number of students may respond better to, or learn better from, media or format types other than video. Some students may prefer listening to audio (e.g., while walking or driving) over watching a video. Other students may prefer reading text over watching a video. These students may not have the patience to sit through a video or audio file. They may want to scan to the best bits of information and could only do so with text. Still other students may prefer to have options of alternately reading text, listening to audio, watching visual content, or mixtures of these media depending, for example, on dynamic changes in their learning environments as the online education course progresses.

Apart from how different students consume information or learn differently, downloading a online education course video to a client device (e.g., client devices 102) can be frustratingly slow in some situations, for example, when the client device is a mobile phone, or when the client device is in a location (e.g., a developing country) with low-bandwidth connectivity. Text may be a useful medium for online education courses in such situations because it can be downloaded faster.

To address at least some of the foregoing drawbacks of video presentations of online education courses, the online education platform 104 may be configured to deliver the content of an online education course video (e.g., course 114) in video-alternative content formats (e.g., audio, text transcripts, slide show presentations, etc.), in accordance with the principles of the present disclosure.

In an example implementation, the online education platform 104 may include, or be coupled to, a course content translator module 116. The content translator module 116 may be configured to automatically convert a primary content (e.g., video content, magazine content, slides-and-audio content, etc.) of an existing online education course (e.g., course 114) into other video-alternative content formats (e.g., audio, text transcripts, slide shows, etc.). The different video-alternative content formats also may be stored in database 108/course material 113 along with the original or starting content of the existing online education course (e.g., course 114). A specific video-alternative content format may be delivered to a client device (e.g., client device 102) by platform 104 based, for example, on the student's situation, circumstance, preference or request.

Figure 2:
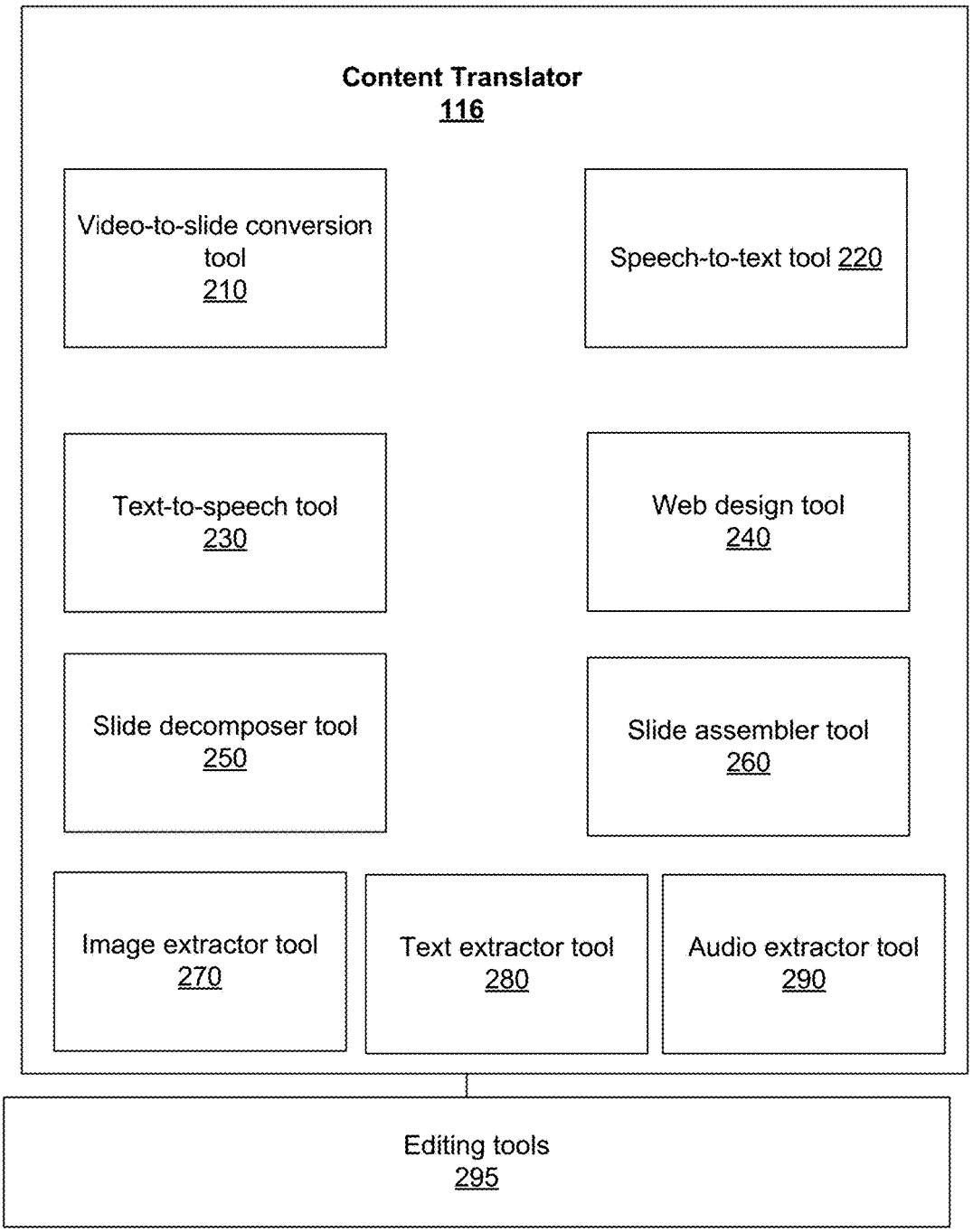
FIG. 2 is a block diagram of an example course content translator module, in accordance with the principles of the present disclosure.

The course content translator module 116 may include, or be coupled to, one or more media conversion tools, media editing tools and web design tools for automatically converting online education course content from one format to another format. FIG. 2 shows an example course content translator module 200, which includes, for example, a video-to-slide conversion tool 210, a speech-to-text conversion tool 220, a text-to-speech conversion tool 230, a web design tool 240, a slide decomposer tool 250, a slide assembler tool 260, an image extractor tool 270, a text extractor tool 280, an audio extractor tool 290, etc.

In the course content translator module 116, the video-to-slide conversion tool 210 may be configured to capture image frames of video input as pictures (e.g., at preset intervals) and convert the pictures into slides. The speech-to-text conversion tool 220 may be configured to automatically transcribe audio portions of online course content as text. Conversely, the text-to speech conversion tool 230 may be configured to automatically synthesize speech audio from an input of plain text. The web design tool 240 may be configured to automatically generate a web magazine layout presentation of text and image documents. The slide decomposer tool 250 may be configured to automatically decompose a slide input into its constituent image and text (e.g., a caption). Conversely, the slide assembler tool 260 may be configured to automatically create a slide by combining an image and text (e.g., a caption). The image extractor tool 270, text extractor tool 280, and audio extractor tool 290 may be configured to automatically extract images, text, and audio, respectively, from input content.

The course content translator module 116 may further include, or be coupled to, one or more editing tools 295 (e.g., a text editor, a photo editor, etc.) that may allow a reviewer to intervene and participate in editing course content being processed by course content translator module 116. A reviewer may, for example, use a text editing tool to edit text input or use a photo editor tool to add frames, text, and effects to images (e.g., slides).

Figure 3:
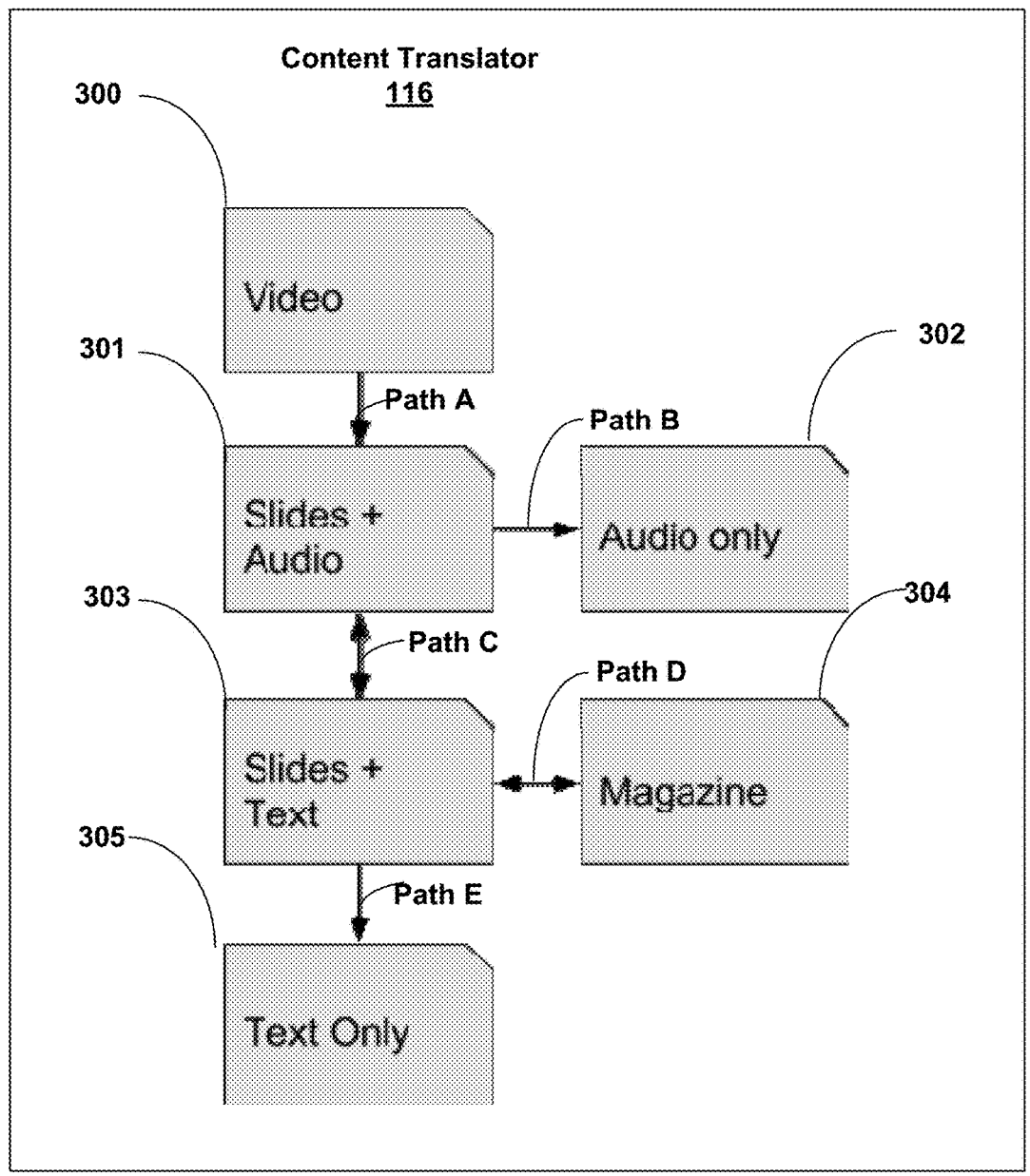
FIG. 3 is a schematic illustration of example translation pathways in the course content translator module of FIG. 2 for automatically converting online education course content from one format to another format, in accordance with the principles of the present disclosure.

The course content translator module 116 may include different translation pathways for automatically converting online education course content from one format to another format. FIG. 3 is a block diagram which schematically shows example translation pathways (e.g., paths A-E) in course content translator module 116 for automatically converting online education course content from one format to another format, in accordance with the principles of the present disclosure.

As shown in FIG. 3, path A may be used to convert video 300 into a "slides-plus-audio" content 301 for a slide show presentation of the online education course. Images in video 300 may be used to make slides for the slides-plus-audio content 301. Furthermore, path B may be used to convert video 300 (or slides-plus-audio content 301) into an "audio-only" content 302 for an audio presentation of the online education course. Path C may be used to convert video 300 (or slides-plus-audio content 301) into a "slides-plus-text" content 303 for another slide show presentation of the online education course. Path C may also be used to automatically transcribe audio content in video 300 (or slides-plus-audio content 301) to form the text portion of slides-plus-text content 303. Path D may be used to convert slides-plus-text content 303 into a book or magazine content 304 for a magazine style web presentation of the online education course. Furthermore, path E may be used to convert video 300 (or any of the preceding content format types) into a "text-only" content 304 for a text presentation of the online education course. Text-only content 304 may be prepared, for example, by transcribing audio portions of the preceding content format if present, or by removing slides and/or from the preceding content format which already include text.

Some the foregoing paths A-E for automatically converting online education course content from one format to another format may be bidirectional. For example, path C used to convert slides-plus-audio content 301 into slides-plus-text content 303 (as described above) may be reversed to convert slides-plus-text content 303 to slides-plus-audio content 301. Similarly, path D used to convert slides-plus-text content 303 into book or magazine content 304 (as described above) may be reversed to convert book or magazine content 304 to slides-plus-text content 303.

In an example implementation, each of the paths (e.g., paths A-E, etc.) for converting online education course content from one format to another format may be executed in the content translator module 116 via procedures arranged in a respective translation module. The procedures in the translation modules may be performed using one or more of media conversion tools, media editing tools and web design tools, which may be included in content translator module 116 (as shown for example in FIG. 2).

FIG. 4 shows, for example, an example translation module 400 that includes procedures for automatically transforming slides-plus-audio content 301 into magazine content 304 along a combination of path C and path D, in accordance with the principles of the present disclosure. Furthermore, FIG. 5 illustrates, for example, an example translation module 500 that includes procedures for automatically transforming magazine content 304 into slides-plus-audio content 301 along a combination of path C and path D (reversing the direction of FIG. 4).

With reference to FIG. 4, the translation module 400 may include a slide decomposer procedure 410, a speech-to-text convertor procedure 420, and a magazine layout composer procedure 430. Online education course content that is input to the translation module 400 may include, for example, slides-plus-audio content 301 that includes a slides portion (e.g., slides 301a) and an accompanying audio portion (e.g. audio 301b).

In the translation module 400, the slide decomposer procedure 410 may automatically decompose input slides 301a to create, for example, FIG. 301c, with each figure including an image 301d and a caption 301e. Furthermore, the speech-to-text convertor procedure 420 may automatically convert input audio 303b into narrative text 301f. Lastly, the magazine layout composer procedure 430 may automatically combine the outputs of procedures 410 and 420 (i.e., FIG. 301c and narrative text 301f) to produce magazine content 304, which includes narrative text with FIG. 304a for a magazine style web presentation of the online education course.

With reference to FIG. 5, the translation module 500 may, for example, include the figure extractor procedure 510, the slide assembler procedure 520, the text extractor procedure 530, the text-to-speech convertor procedure 540, and the audio synchronization procedure 550. Online education course content that is input to the translation module 500 may include magazine content 304 that includes narrative text with FIG. 304a.

In the translation module 500, the figure extractor procedure 510 may automatically extract FIG. 304b from input narrative text with FIG. 304a. The slide assembler procedure 520 may automatically process the extracted figures to assemble slides 304b. Furthermore, text extractor procedure 530 may automatically extract narrative text 304d from input narrative text with FIG. 304a, and the text-to-speech procedure 540 may automatically convert the extracted narrative text into audio 304e. Lastly, the audio synchronizer procedure 550 may automatically combine the outputs of procedures 520 and 540 (i.e. slides 304c and audio 304e) to produce slides-plus-audio content 301 that includes slides 301a and audio 303b to create a slide show web presentation of the online education course.

The automated translation procedures for translating the original or starting content of the online education course stored in the database from a first format type to a content of a second format type (which may, for example, be implemented using the content translator 116 described in the foregoing with reference to FIGS. 2-5) may be expected to produce acceptable media artifacts. The translated content (i.e. content of the second format type) of the online education course may be previewed to determine if the media artifacts in the translated content and the resultant presentation of the course in the second format would meet, or be compatible, with the purpose and objectives of the online education course as presented in its original format. Only a translation that meets, or is compatible, with the purpose and objectives of the online education course as presented in its original format may be considered to be valid alternative-format version of the original online education course.

In an example implementation, a community preview schema may be implemented to validate the translations and improve them if necessary. Members of a preview community member may include, for example, instructors, the online education course provider's personnel, experts, volunteer students, etc.). One of more members of the preview community members may compare original and draft translated contents (e.g., slides-plus-audio content 301 and magazine content 304) of the online education courses (e.g., video 300), approve translations, and propose improvements if necessary or desired. One of more members of the preview community members may use one or more editing tools 295 (e.g., a text editor, a photo editor, etc.) make improvements to the draft translations (e.g., slides-plus-audio content 301 and magazine content 304, etc.) automatically produced by course content translator module 116.

After validation, in example implementations of online education platform 104, online education course content (e.g., course 114) that is converted to a new or changed medium or format by course content translator module 116 may be cached or uploaded to database 108. Thus, an online education course provider may populate database 108 to include different versions of an online education course corresponding to different media or format (including an original medium or format version of the online education course).

The number and types of the different format versions of an online course obtained by executing content translator module 116 to automatically translate the original content (and stored in database 108) may be determined based on, for example, consideration of the nature of the online course and the format type of the original content, and consideration of the expected student demand or preferences for specific formats of the content. For example, it may not make sense for a course on music appreciation to be rendered in text only or a course on art history to be rendered in audio only, without images. Thus, an original course content in audio of the course on music appreciation may not be translated to a text only format, and an original course content in slide show format of the course on art history may not be translated to an audio only format.

Table I below shows a non-exhaustive example of expected student preferences for course content format types (e.g., High Definition (HD) Video, Standard Definition (SD) Video, Slides+Audio, Magazine, Audio only, Text only) for different client devices types (e.g., web browser, tablet, phone, etc.) and different learning situations (e.g., default, not moving, moving, connected (high bandwidth, medium bandwidth, low bandwidth) and not connected).

TABLE I

| Client/Situation | Client Bandwidth (Connected) | | | Not Connecte |
|---|---|---|---|---|
| | High | Medium | Low | |
| Web Browser/Default | High Definition (HD) Video | Standard Definition(SD) Video | Slides + Audio | Text only |
| Native Tablet App/Default | HD Video | SD Video | Slides + Audio | Text only |
| Phone/Device | SD Video | Slides + Audio | Magazine | Text only |

TABLE I-continued

| Client/Situation | Client Bandwidth (Connected) | | | Not Connecte |
|---|---|---|---|---|
| | High | Medium | Low | |
| Not moving Phone/Device | Audio only | Audio only | Audio only | Text only |
| Moving Phone/In Car | Audio only | Audio only | Audio only | |
| Any Client/User prefers | Magazine | Magazine | Text only | Text only |
| Any Client/User prefers audio | Audio only | Audio only | Audio only | Text only |

Figure 6:
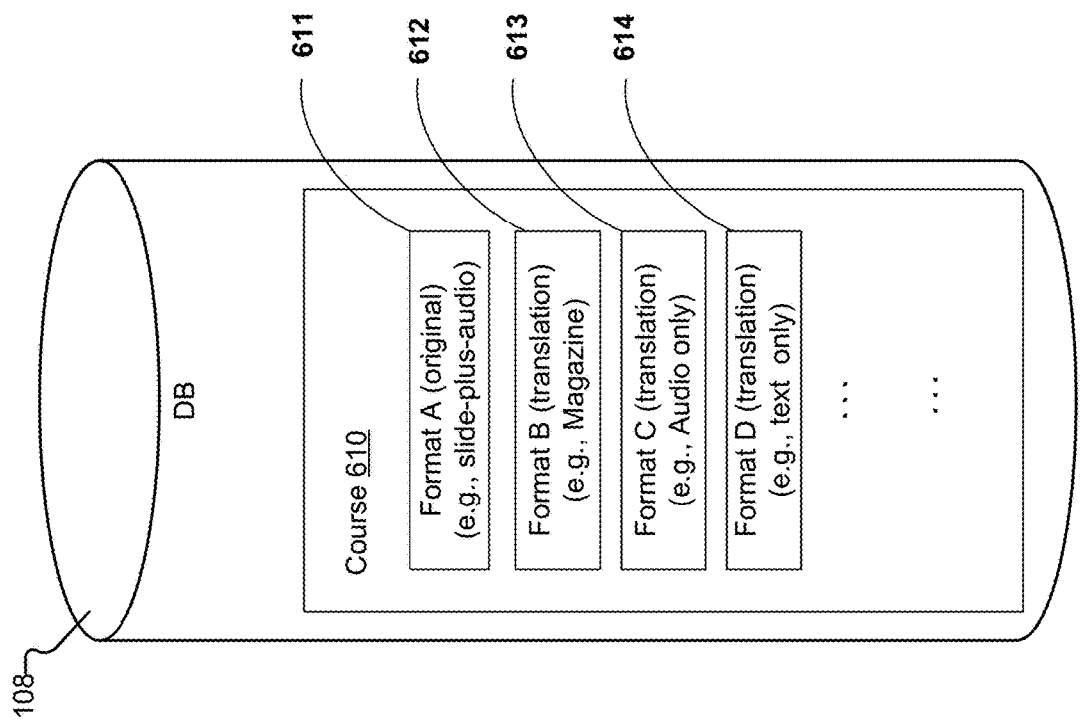
FIG. 6 is a block diagram of four different format versions of an online course stored in a database, in accordance with the principles of the present disclosure.

FIG. 6 schematically shows a sample of four different format versions (e.g., versions 611-614) of an example online course 610 that may be stored in database 108. Versions 611-614 may correspond to different media or formats (e.g., formats A-D, respectively) of the online course content. Format A (e.g., slides-plus-audio) may be the original format of the content of online course 610, for example, as prepared by, or obtained from, a course instructor. Format B (e.g., magazine), format C (e.g., text only), and format D (e.g., audio only) may be formats that are obtained by automatic translation of the original online course 610 content by course content translator module 116. Database 108 may additionally include other media or format versions of online course 610 content (e.g., slide-plus-text format version, etc.) that are obtained by automatic translation of the original online course 610 content by course content translator module 116. However, these additional media or format versions (other than versions 611-614) are not shown in FIG. 6 for visual clarity.

In the operation of the online education platform 104 for serving an online education course to a student on the client device 102, the content server 112 may deliver the online education course content to the client device 102 over network 106 in a format preferred by the student if that format is available in database 108 and when compatible with the client device type and conditions (e.g., network conditions).

In an example implementation, the student may submit his or her preferences for online education course content format types, for example, when establishing an account with the online education provider, when enrolling for the specific online education course, or at a later time (e.g., before the online education course starts or even during progress of the online education course). The student's preferences for content format types may be cached by platform 104, for example, along with the student's profile stored in database 108 or in other memory locations. The student's preferences for content format types may be expressed as an ordered ranking or a preference list of formats (e.g., format B>format A>format D, etc.). Content server 112 may deliver the online education course content in the format listed highest in the student's preference list (e.g., format B) if that format is available in database 108. If the highest listed format is not available in database 108, content server 112 may fall back through the student's preference list to serve the next highest listed format in the student's preference list that matches a format that is available in database 108. In case none of the formats in the student's preference list are available in database 108, content server 112 may return an error to client device 102.

Figure 7:
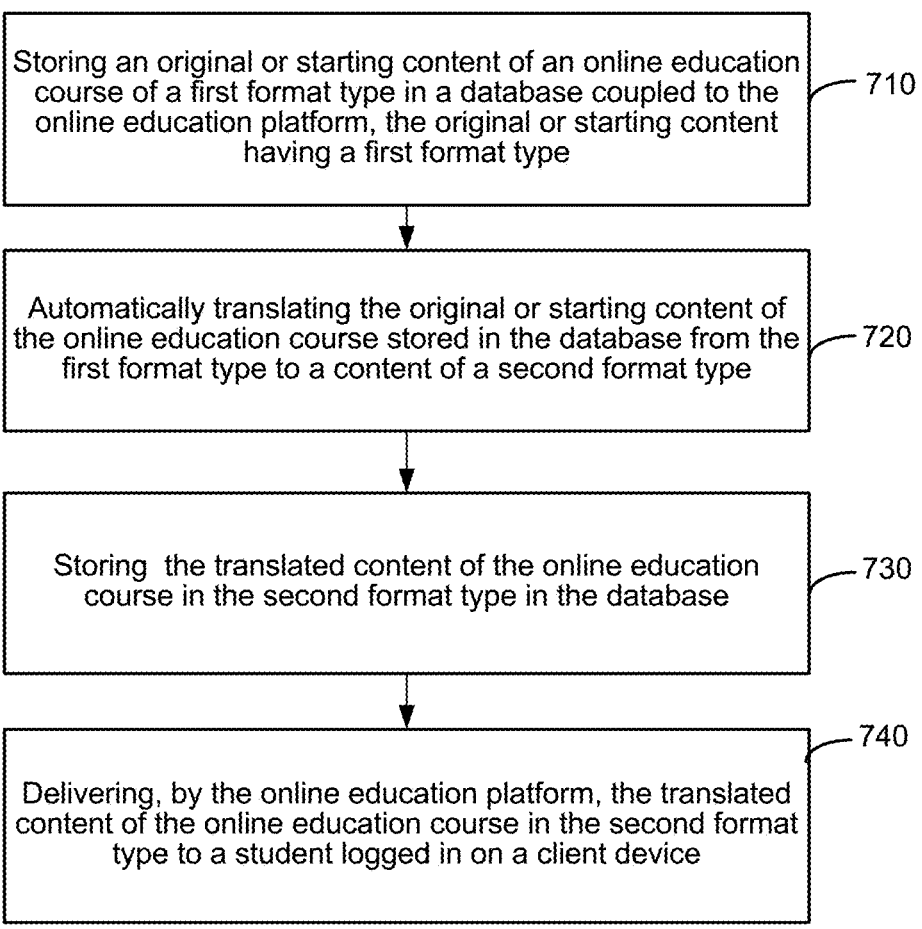
FIG. 7 is a flowchart of a method for adapting content of an online education course to a student's preference for content format, in accordance with the principles of the present disclosure.

FIG. 7 shows an example method 700 for adapting content of an online education course delivered by an online education platform (e.g., online education platform 104) to a student's preference of content format, in accordance with the principles of the present disclosure. The student may be logged on a client device connected to the online education platform via a network (e.g., Internet). An original or starting content of the online education course stored in a database may have a content format, which may, for example, be one of a high definition video, a standard definition video, a slides-plus-audio, a slides-plus-text, a magazine, a slides-only, an audio-only, or a text-only type of format. The content of the online education course delivered by the online education platform to the client device may be adapted from original or starting content format to have a content format matching the student's preference of content format type.

The method 700 includes storing an original or starting content of the online education course of a first format type in a database coupled to the online education platform (710), automatically translating the original or starting content of the online education course stored in the database from the first format type to a content of a second format type (720), and storing the translated content of the online education course content in the second format type in the database (730). The method 700 may further include delivering, by the online education platform, the translated content of the online education course in the second format type to a student logged in the online education platform via a client device (740).

In an example implementation, method 700 may further include detecting a student preference for the online education course content of the second format type over content of the first format type. Delivering the translated content of the online education course in the second format type to the student logged in to the online education platform via the client device 740 may be based on the detected student preference.

In an example implementation, method 700 may further include determining a compatibility of the translated content of the online education course with the client device type (e.g., desktop, mobile phone, moving or stationary, etc.) and network conditions (e.g., low bandwidth, high bandwidth, etc.). Delivering the online education course content of the second format type to the student on the client device 740 may also be based on the determined compatibility of the second format type with the client device type and network conditions In method 700, automatically translating the original or starting content of the online education course stored in the database from the first format type to a content of a second format type 720 may include using automated translation procedures in a course content translator module (e.g., course content translator module 116) coupled to the online education platform.

When the first format type content of the online education course stored in the database includes a video component, automatically translating the original content of the online education course stored in the database from the first format type to a content of a second format type 720 may include capturing image frames of the video component (e.g., at preset intervals) as pictures and converting the pictures into slides for inclusion in the content of the second format type.

When the first format type content of the online education course stored in the database includes an audio component, automatically translating the original content of the online education course stored in the database from the first format type to a content of a second format type 720 may include automatically transcribing the audio component of the online course content as text for inclusion in the content of the second format type.

When the first format type content of the online education course stored in the database includes an audio component, automatically translating the original content of the online education course stored in the database from the first format type to a content of a second format type 720 may include includes extracting the audio component of the online course content as audio for inclusion in the content of the second format type.

When the first format type content of the online education course stored in the database includes a text component, automatically translating the original content of the online education course stored in the database from the first format type to a content of a second format type 720 may include automatically synthesizing speech audio from an input of plain text derived from the content of the first format type for inclusion in the content of the second format type.

When the first format type content of the online education course stored in the database includes a slide, automatically translating the original content of the online education course stored in the database from the first format type to a content of a second format type 720 may include automatically decomposing the slide into a figure for inclusion in the content of the second format type. The figure may include an image and a caption.

When the second format type content of the online education course includes a magazine-style web page, automatically translating the original content of the online education course stored in the database from the first format type to a content of a second format type 720 may include automatically laying out figures, captions and narrative text input derived from the content of the first format type in the magazine-style web page.

When the second format type content of the online education course includes a slide show, automatically translating the original content of the online education course stored in the database from the first format type to a content of a second format type 720 may include synchronizing speech (or audio) and slides input derived from the content of the first format type for inclusion in the content of the second format type.

When the content of the second format type includes a magazine-style web page, the automated translation procedures may include web design processes automatically laying out figures, captions and narrative text input derived from the content of the first format type in the magazine-style web page.

For all of the different course content formats (original or translated) (e.g., video, slides-plus-audio, slides-plus-text, magazine, slides only, audio only, or text only, etc.) that a student may avail of as the online education course progresses, the student's successful completion of the online education course may be evaluated based on the student's submission of coursework (e.g., submission of coursework such as a quiz, an exam, a homework assignment or a survey, etc.) to online education platform 104. After the student's coursework submissions to online education platform 104 are evaluated and authenticated (as being made by the student himself or herself) and the student's identity is verified, online education platform 104 may issue a verified credential to the student indicating successful completion of the online education course, regardless of the different course content formats (original or translated) that student may have availed of during progress of the online education course.

While certain features of the described embodiments and implementations have been described herein, many modifications, substitutions, changes and equivalents will now occur to those skilled in the art. It is, therefore, to be understood that the appended claims are intended to cover all such modifications and changes as fall within the scope of the described embodiments and implementations.

What is claimed is:

1. A computer-implemented method, comprising:
   storing an original content of an online education course in a medium of a first type in a database coupled to an online education platform, the original content corresponding to a set of media elements of the medium of the first type;
   automatically converting the original content of the online education course stored in the database to a content having different media elements than the original content;
   storing the converted content of the online education course in a medium of a second type in the database; and
   delivering, by the online education platform, either the original content in the medium of the first type or the converted content of the online education course in the medium of the second type to a student logged in to the online education platform based on a determination of a compatibility of different medium types with limitations of a computing device of the student, a study environment of the student, and/or network conditions.

2. The method of claim 1 further comprising detecting a student preference for the online education course content in the medium of the second type over content in the medium of the first type, wherein delivering the converted content of the online education course in the medium of the second type to the student logged in to the online education platform via the client device is based on the detected student preference.

3. The method of claim 1 further comprising determining a compatibility of the medium of the second type with the client device type and network conditions, wherein delivering the converted content of the online education course in the medium of the second type to the student logged in to the online education platform via the client device is based on the determined compatibility.

4. The method of claim 1, wherein the medium of the first type is a video, a slides-plus-audio, a slides-plus-text, a magazine, a slides only, an audio-only, or a text-only medium type.

5. The method of claim 1, wherein the medium of the first type stored in the database includes a video component, and wherein automatically converting the original content of the online education course stored in the database to a content having different media elements than the original content includes capturing image frames of the video component as pictures and converting the pictures into slides for inclusion in the medium of the second type.

6. The method of claim 1, wherein the medium of the first type stored in the database includes an audio component, and wherein automatically converting the original content of the online education course stored in the database to a content having different media elements than the original content includes automatically transcribing the audio component as text for inclusion in the medium of the second type.

7. The method of claim 1, wherein the medium of the first type stored in the database includes an audio component, and wherein automatically converting the original content of the online education course stored in the database to a content having different media elements than the original content includes extracting the audio component as audio for inclusion in the medium of the second type.

8. The method of claim 1, wherein the medium of the first type stored in the database includes a text component, and wherein automatically converting the original content of the online education course stored in the database to a content having different media elements than the original content includes automatically synthesizing speech audio from an input of plain text derived from the text component for inclusion in the medium of of the second type.

9. The method of claim 1, wherein the medium of the first type stored in the database includes a slide, and wherein automatically converting the original content of the online education course stored in the database to a content having different media elements than the original content includes automatically decomposing the slide into a figure for inclusion in the medium of the second type.

10. The method of claim 1, wherein the medium of the second type includes a magazine-style web page, and wherein automatically converting the original content of the online education course stored in the database to a content having different media elements than the original content includes automatically laying out figures, captions and narrative text input derived from the medium of the first type in the magazine-style web page.

11. The method of claim 1, wherein the medium of the second media type includes a slide show, and wherein automatically converting the original content of the online education course stored in the database from the first media type to a content having different media elements than the original content includes synchronizing speech and slides input derived from the slide show for inclusion in medium of the second type.

12. A system, comprising:
    a memory; and
    a processor coupled to the memory, the processor configured to execute instructions stored in the memory to:
    store an original content of an online education course in a medium of a first type in a database coupled to an online education platform, the original content corresponding to a set of media elements of the medium of the first type;
    automatically convert the original content of the online education course stored in the database to a content having different media elements than the original content;
    store the converted content of the online education course in a medium of a second type in the database; and
    deliver, by the online education platform, either the original content in the medium of the first type or the converted content of the online education course in the medium of the second type to a student logged in to the online education platform based on a determination of a compatibility of different medium types with limitations of a computing device of the student, a study environment of the student, and/or network conditions.

13. The system of claim 12, wherein the processor is further configured to execute instructions stored in the memory to detect a student preference for the online education course content in the medium of the second type over content in the medium of the first type, and wherein the online education platform is configured to deliver the converted content of the online education course in the medium of the second type to the client device based on the detected student preference.

14. The system of claim 12, wherein the processor is further configured to execute instructions stored in the memory to determine a compatibility of the medium of the second type with the client device type and network conditions, and wherein the online education platform is configured to deliver the converted content of the online education course in the medium of the second type to the client device based on the determined compatibility.

15. The system of claim 12, wherein the medium of the first type stored in the database includes a video component, and wherein the processor is configured to execute the instructions stored in the memory to capture image frames of the video component as pictures and convert the pictures into slides for inclusion in the medium of the second type.

16. The system of claim 12, wherein the medium of the first media type stored in the database includes an audio component, and wherein the processor is configured to execute the instructions stored in the memory to automatically transcribe the audio component as text for inclusion in the medium of the second type.

17. The system of claim 12, wherein the medium of the first type stored in the database includes an audio component, and wherein the processor is configured to execute the instructions stored in the memory to automatically extract the audio component as audio for inclusion in the medium of the second type.

18. The system of claim 12, wherein the medium of the first type stored in the database includes slides, and wherein the processor is configured to execute the instructions stored in the memory to automatically decompose each slide into a figure for inclusion in the medium of the second type.

19. The system of claim 12, wherein the medium of the second type includes a magazine-style web page, and wherein the processor is configured to execute the instructions stored in the memory to automatically lay out figures, captions and narrative text input derived from the medium of the first type in the magazine-style web page.

20. The system of claim 12, wherein the medium of the second type includes a slide show, and wherein the processor is configured to execute the instructions stored in the memory to automatically synchronize speech and slides input derived from the medium of the first type for inclusion in the slide show.

\* \* \* \* \*

UNITED STATES PATENT AND TRADEMARK OFFICE
CERTIFICATE OF CORRECTION

PATENT NO. : 10,395,546 B2
APPLICATION NO. : 15/273234
DATED : August 27, 2019
INVENTOR(S) : Schlender et al.

Page 1 of 1

It is certified that error appears in the above-identified patent and that said Letters Patent is hereby corrected as shown below:

In the Claims

In Column 16, Claim 8, Line 10, delete "of of" and insert -- of --, therefor.

Signed and Sealed this
Twenty-second Day of October, 2019

Andrei Iancu
*Director of the United States Patent and Trademark Office*